Patented Nov. 28, 1922.

1,437,149

UNITED STATES PATENT OFFICE.

ANTONIO PERELLI MINETTI, OF UKIAH, CALIFORNIA.

PROCESS OF PROTECTING VEGETATION FROM FROST.

No Drawing. Application filed June 9, 1922. Serial No. 567,200.

*To all whom it may concern:*

Be it known that I, ANTONIO PERELLI MINETTI, a citizen of the United States, residing at Ukiah, in the county of Mendocino and State of California, have invented a new and useful Process of Protecting Vegetation from Frost, of which the following is a specification.

The invention relates to a process of protecting vegetation from the injurious effects of frost.

Great damage results yearly to vegetation from the effects of frosts and such damage is not confined to food producing plants and trees but flowers, shrubbery and various other forms of vegetation. It has been found that the injury to vegetation from frost results from the extraction of moisture from the vegetation in the formation of the frost and not, as often supposed, merely from the contact of ice and cold with the blossoms, foliage and other exposed portions of vegetation.

In the formation of frost there is radiation of heat and the lowering of temperature accompanied by the freezing of moisture, which is usually supplied by the atmosphere surrounding the plants and by moisture from the plants, with the result of more or less damage to the plants and trees affected. I find that this injury to plants and other forms of vegetation may be prevented by supplying sufficient moisture artificially to the atmosphere to permit the formation of frost from moisture contained entirely in the atmosphere and without extracting moisture from the vegetation.

The invention, therefore, consists primarily in a process of protecting vegetation from frost by enveloping the plants in an artificial mist or rain, sufficient to supply an excess of moisture to the atmosphere for the formation of frost from the moisture of the atmosphere alone and maintaining the artificial rain or mist during the frost forming period to preserve the moisture contained in the plants.

By the term plants it will be understood that all forms of vegetation are included therein. The process may be practically carried out by means of jets or sprays of various constructions arranged to discharge the moisture in a fine mist above the vegetation to be protected, and reservoirs or tanks, pumps or any other suitable source of water supply may be utilized. In this manner the pressure from elevated tanks, supplied by mountain streams or by water pumped from rivers or other bodies of water, may be used and the water may be directly pumped from rivers, lakes and other bodies of water into pipes supplying the jets or sprays. As the apparatus for carrying out the process will be obvious, illustration thereof is deemed unnecessary.

The water or moisture flowing upon the plants and enveloping the same may freeze if the temperature falls sufficiently but this freezing will not injuriously affect the plants, either as to the blossoms or the foliage if an excess of moisture is maintained in the atmosphere to supply the moisture necessary to the formation of frost without extracting moisture from the plants.

What is claimed is:

1. The process of protecting plants from the injurious effects of frost, which consists in supplying to the atmosphere surrounding the plants moisture, and maintaining in the atmosphere moisture in excess of that necessary for the formation of frost.

2. The process of protecting plants from the injurious effects of frost which consists in spraying the plants to produce an artificial rain or mist enveloping the plants, and maintaining the artificial rail or mist during the frost forming period.

In testimony whereof I have hereunto set my hand.

ANTONIO PERELLI MINETTI.